(12) United States Patent
Dinger et al.

(10) Patent No.: US 7,031,428 B2
(45) Date of Patent: Apr. 18, 2006

(54) SUBSTRATE MATERIAL FOR X-RAY OPTICAL COMPONENTS

(75) Inventors: Udo Dinger, Oberkochen (DE); Frank Eisert, Aalen (DE); Martin Weiser, Sinsheim (DE); Konrad Knapp, Mainz (DE); Ina Mitra, Stadecken-Elsheim (DE); Hans Morian, Schlangenbad (DE)

(73) Assignees: Carl-Zeiss SMT AG, Oberkochen (DE); Schott AG, Mainz (DE)

( * ) Notice: Subject to any disclaimer, the term of this patent is extended or adjusted under 35 U.S.C. 154(b) by 36 days.

(21) Appl. No.: 10/779,516

(22) Filed: Feb. 13, 2004

(65) Prior Publication Data

US 2004/0202278 A1 Oct. 14, 2004

Related U.S. Application Data

(63) Continuation of application No. PCT/EP02/09107, filed on Aug. 14, 2002.

(30) Foreign Application Priority Data

Aug. 16, 2001 (DE) ................................ 101 39 188

(51) Int. Cl.
*G21K 5/04* (2006.01)
*G21K 1/06* (2006.01)
*C03C 10/00* (2006.01)

(52) U.S. Cl. .......................... 378/34; 378/84; 378/85; 250/492.2; 501/4

(58) Field of Classification Search .............. 378/34, 378/35, 84, 85; 359/359; 501/4; 428/426, 428/846.9; 250/492.2

See application file for complete search history.

(56) References Cited

U.S. PATENT DOCUMENTS

| 2,326,059 | A | 8/1943 | Nordberg | 106/52 |
|---|---|---|---|---|
| D322,813 | S | 12/1991 | Wilson | D19/88 |
| 5,070,045 | A | 12/1991 | Comte et al. | 501/4 |
| 5,591,682 | A | 1/1997 | Goto | 501/4 |
| 6,198,793 | B1 | 3/2001 | Schultz et al. | 378/34 |
| 6,244,717 | B1 | 6/2001 | Dinger | 359/859 |
| 6,377,655 | B1 | 4/2002 | Murakami et al. | 378/84 |
| 6,465,272 | B1* | 10/2002 | Davis et al. | 438/72 |
| 6,931,097 | B1* | 8/2005 | Davis et al. | 378/84 |
| 2001/0028518 | A1 | 10/2001 | Kaiser | 359/883 |
| 2002/0114089 | A1 | 8/2002 | Dinger et al. | 359/853 |
| 2004/0166420 | A1* | 8/2004 | Aschke et al. | 430/5 |
| 2004/0174624 | A1* | 9/2004 | Weiser et al. | 359/883 |
| 2005/0065011 | A1* | 3/2005 | Goto | 501/4 |

FOREIGN PATENT DOCUMENTS

| DE | 199 03 807 A1 | 11/1999 |
|---|---|---|
| DE | 199 23 609 A1 | 12/1999 |
| DE | 198 30 449 A1 | 1/2000 |
| DE | 199 07 038 A1 | 8/2000 |
| EP | 0 955 565 A2 | 11/1999 |
| JP | 04367538 A | 12/1992 |
| JP | 2000247681 A | 9/2000 |
| WO | WO02099818 | 12/2002 |

OTHER PUBLICATIONS

XP-000991487 Mask Substrate Requirements and Development for Extreme Ultraviolet Lithography (EUVL), by Tong et al., and Lawrence Livermore Nat'l Lab., Motorola, and Intel Corp., (Sep. 1999), SPIE vol. 3873, pp. 421-428.
XP-008012782 Experiences in the Precision Machining of Grazing Incidence X-Ray Mirror Substrates, by McKeown et al., from Cranfield Unit for Precision Engineering and Cranfield Institute of Technology, (1985), SPIE vol. 571, Large Optics Technology, pp. 42-50.
Mirror Subtrates for EUV-Lithography: Progress in Metrology and Optical Fabrication Technology, by Dinger et al., (2000), SPIE vol. 4146, pp. 35-46.
Allen et al. "An Ion Figuring System for Large Optic Fabrication", SPIE vol. 1168 Current Developments in Optical Engineering and Commercial Optics (1989), pp. 33-50.
Allen et al. "Demonstration of an Ion Figuring Process", SPIE vol. 1333 Advanced Optical Manufacturing and Testing (1990), pp. 22-33.
Wilson et al. "Surface Figuring Using Neutral Ion Beams", SPIE vol. 966 Advances in Fabrication and Metrology for Optics and Large Optics (1988), pp. 74-80.

* cited by examiner

*Primary Examiner*—Allen C. Ho
(74) *Attorney, Agent, or Firm*—Ohlandt, Greeley, Ruggiero, & Perle LLP.

(57) ABSTRACT

There is provided a substrate material for an optical component for X-rays of wavelength $\lambda_R$. The substrate includes (a) a glass phase made of amorphous material having a positive coefficient of thermal expansion, and (b) a crystal phase including microcrystallites having a negative coefficient of thermal expansion and a mean size of less than about $4\,\lambda_R$. The substrate material has a stoichiometric ratio of the crystal phase to the glass phase such that a coefficient of thermal expansion of the substrate material is less than about $5 \times 10^{-6}\,K^{-1}$ in a temperature range of about 20 °C. to 100°C. The substrate material, following a surface treatment, has a high spatial frequency roughness (HSFR) of less than about $\lambda_R/30$ rms.

28 Claims, No Drawings

SUBSTRATE MATERIAL FOR X-RAY OPTICAL COMPONENTS

CROSS-REFERENCE TO RELATED APPLICATIONS

The present application is a continuation of International Application No. PCT/EP02/09107, filed Aug. 14, 2002. The PCT/EP02/09107 application claims priority of German Patent Application No. 101 39 188.9, filed Aug. 16, 2001.

BACKGROUND OF THE INVENTION

1. Field of the Invention

The invention relates to a substrate material for X-ray optical components, comprising a glass ceramic material with a thermal expansion $|\alpha|<5\times10^{-6}\,K^{-1}$ in a predetermined temperature range of, a method for producing such a substrate material, and a use of such a substrate material.

2. Description of the Related Art

X-ray optical components are especially of particular interest in the field of X-ray lithography. This applies in particular to lithography with soft x-rays, i.e., EUV lithography in the wavelength region of 10 to 30 nm. Mirrors with the highest possible reflectivity in the X-ray region are used as optical components in the field of X-rays. Such X-ray mirrors can be operated close to perpendicular incidence or in grazing incidence, namely as so-called normal or grazing incidence mirrors.

X-ray mirrors comprise a substrate and, based thereon, a multilayer system. The multilayers are also known as "Distributed Bragg Reflectors" (DBRs). The multilayers allow the realization of mirrors with high reflectivity in the X-ray region in the case of non-grazing incidence, i.e. in the normal incidence operation. A grazing incidence mirror has a simpler structure than a normal incidence mirror because the grazing incidence mirror has fewer of the multilayers.

X-ray mirrors that are operated close to perpendicular incidence (normal incidence) are preferred over mirrors that are operated with grazing incidence in cases where high imaging quality by low aberrations is required, e.g., in imaging systems such as projection lens systems for EUV lithography systems.

In order to increase the reflectivity of grazing incidence mirrors, the substrates of these mirrors can also be provided with a multilayer system.

Reference is hereby made to DE 199 23 609 A1 and U.S. application Ser. No. 09/322,813, as filed with the US Patent Office on 28 May 1999 under the title "Reduction objective for extreme ultraviolet lithography", now U.S. Pat. No. 6,244,717, concerning projection lens systems for EUV lithography and related X-ray optical components, the scope of disclosure of which is hereby fully incorporated into the present application.

Multilayer systems based on the substrate can be layer systems comprising layer pairs of Mo/Si, Mo/Be, or MoRu/Be, and having 40 to 100 such layer pairs. Such systems provide reflectivity in the region of 70 to 80% in the EUV range $\lambda_R=10$ to 30 nm. Depending on the wavelength of the light to be reflected, layer systems of other materials can be used.

The high reflectivity of the layer stack is achieved by phase-adjusted superposition and constructive interference of the partial wave fronts reflected on the individual layers. The layer thicknesses must be controlled to be within about 0.1 nm of a desired thickness.

The necessary preconditions for the achievement of high reflectivity are sufficiently low layer and substrate roughness in the high spatial frequency roughness (HSFR) range. Depending on the approach, this spatial frequency range leads to loss of light by scattering outside of the image field of the lens system or by disturbance of the microscopically phase-correct superposition of the partial wave trains. The relevant spatial frequency range is downwardly limited by the criterion of scattering outside of the image field and depending on the application it is typically at EUV wavelengths in the region of some μm. Generally, no limit is specified towards high spatial frequencies. A useful limit value lies in the range of half the wavelength of the incident light, because higher spatial frequencies are no longer seen by the incident photons. HSFR is usually measured with atomic force microscopes (AFM) which have the required lateral resolution.

Concerning the definition of HSFR, MSFR and fine surface figure error, as used herein, reference is hereby made to:

U. Dinger, F. Eisert, H. Lasser, M. Mayer, A. Seifert, G. Seitz, S. Stacklies, F. J. Stiegel, M. Weiser, "Mirror Substrates for EUV-lithography; progress in metrology and optical fabrication technology", Proc. SPIE Vol. 4146, 2000, the scope of disclosure of which is hereby fully incorporated into the present application.

The fine surface figure error range according to the above publication reaches from the optically free diameter, i.e. the aperture of the mirror, up to 1 mm of roughness wavelength. MSFR comprises the roughness wavelengths from 1 μm to 1 mm. The HSFR range comprises roughness wavelengths of 10 nm to 1 μm.

Other X-ray optical components may require a structure that is characterized by high reflectivity and low thermal expansion. Examples are a reticle mask for an EUV projection illumination system, a mirror with raster elements, a so-called optical integrator or a collector mirror of an EUV illumination system. Reference is hereby made to DE 199 03 807 A1 and U.S. application Ser. No. 09/305,017, as filed with the US Patent Office on 4 May 1999 under the title "Illumination system particularly for EUV lithography", now U.S. Pat. No. 6,198,793, the scope of disclosure of which is hereby fully incorporated into the present application.

Substrate materials for multilayer systems which are based on such materials are currently crystalline silicon, amorphous and semi-crystalline glasses such as the glass ceramic material ZERODUR® of Schott-Glas, Mainz.

In the field of high spatial frequency roughness (HSFR), a sufficient value of 0.1 nm rms for example can be achieved with classical superpolishing methods both on silicon as well as ZERODUR® and amorphous glasses. Since these methods lead at least in the aspheric regions generally to a deterioration of the fine surface figure error, i.e. defects in the low spatial frequency region, and in the mid spatial frequency roughness (MSFR) range to a deterioration of the long-wave shares in MSFR, it is usually necessary to provide a roughness-maintaining fine correction process after the superpolishing process.

Surface figure error and also the long-wave shares in MSFR (mm waves) can be brought to specification with beam processing methods, i.e. the IBF (ion beam figuring). The advantage of this method is that tools used in the method can sit closely to the working surface, and so the tools can fit snugly on the typically aspheric surfaces. These beam processing methods are based on sputtering processing. The global and local sputtering rates depend on the physical and chemical bonding conditions in the solid body to be processed.

Whereas in single-crystalline silicon the additional energy introduced by the incident ions leads to a surface reorientation with the result of improved roughness, a slight deterioration of HSFR is observed in amorphous glass from approx. 0.06 to 0.15 nm rms. In semi-crystalline glass ceramic material such as ZERODUR® for example, with a crystalline size of greater than 50 nm, there was a serious deterioration from 0.1 to 0.4 nm rms.

Glass ceramic materials with a crystallite size of high quartz mixed crystals $\geq 80$ nm and a mean coefficient of thermal expansion $\alpha_{20°\,C.-700°\,C.} < 0.5 \cdot 10^{-6}/K$ are known from DE 199 07 038 A1.

Heat-resistant ceramic materials with a mean surface roughness $\leq 0.03$ μm are shown by JP-A-04-367538. JP-A-04-367538 does not provide any disclosure concerning the mean thermal expansion. Furthermore, JP-A-04-367538 makes no statements as to the spatial frequency range in which these roughness values are achieved.

Although the single-crystalline silicon is a suitable carrier under the aspect of the roughness requirements that are demanded for the substrate material, single-crystalline silicon has a mechanical anisotropy however and only allows for small mirror sizes due to its property as single crystal. Although the disadvantage of a coefficient of thermal expansion $\alpha$ which is higher than that of glasses can be compensated partly by a considerably higher thermal conductivity and suitable cooling, it still requires a high amount of technical effort. Silicon as a substrate is currently only considered in the case of very high thermal loads such as in illumination systems.

Although the thermal expansion and the roughness in the HSFR range are unproblematic when using amorphous glasses with low thermal expansion such as glasses as described in U.S. Pat. No. 2,326,059, sufficient surface figure error and MSFR values cannot be reached because the lamellae-like striated structure or Schlieren-structure of amorphous glass with negligibly low thermal expansion has a disadvantageous effect in these frequency ranges. As a result, these layers of a thickness of approx. 0.1 mm on moderately curved mirror surfaces lead to non-correctable surface modulations in the mm range with amplitudes of a number of nanometers far outside the values required for EUV-lithography. This effect is also observed in ion-beam-based production processes.

Although the semi-crystalline glass ceramic material ZERODUR® with crystallite sizes of greater than 50 nm has the desired low coefficient of thermal expansion, it leads to excessive roughness values in the HSFR range in the final beam processing process.

It is the object of the present invention to provide a substrate material for X-ray optical components which has a low coefficient of thermal expansion like glass for example, but on the other hand ensures a sufficient surface quality of the X-ray optical components after the necessary surface processing steps.

SUMMARY OF THE INVENTION

The object of the invention is achieved by a glass ceramic material as a substrate material for X-ray optical components with an amorphous and a crystalline glass share. The glass ceramic material has a low coefficient of thermal expansion, the size of the crystallites, also known as microcrystallites, is $<4\lambda_R$, preferably $<2\lambda_R$, especially preferably $<\lambda_R$, even more preferably $<2\lambda_R/3$, especially $<\lambda_R/2$, with $\lambda_R$ designating the mean wavelength of the incident X-rays. The substrate material in accordance with the invention still has sufficiently low roughness in the HSFR range after surface treatment, especially after an ion beam figuring (IBF) process.

DESCRIPTION OF THE INVENTION

The inventors have surprisingly determined that certain glass ceramic materials fulfill all requirements concerning thermal expansion and surface properties. Such materials are stated in the following table 1.

TABLE 1

Glass ceramic materials and roughness

| Glass ceramic material | Crystal size | HSFR before beam processing | HSRF after beam processing |
|---|---|---|---|
| CLEARCERAM Z ® (Ohara Co.) | 38 nm | 0.13 nm | 0.24 nm |
| KERALITE ® (Eurokera Co.) | 35 nm | 0.10 nm | 0.23 nm |

The materials have a crystallite size of 35 nm (KERALITE® of Eurokera Co.) or 38 nm (CLEARCERAM Z® of Ohara Co.). The HSFR, i.e. the roughness in the roughness wavelength range of 1 μm to 10 nm is 0.13 prior to beam processing and 0.24 nm after the beam processing (CLEARCERAM Z®) and 0.10 nm prior to beam processing and 0.23 nm after beam processing (KERALITE®). Reference is hereby made to U.S. Pat. No. 5,591,682 concerning the composition of CLEARCERAM Z® of Ohara Co. and and to U.S. Pat. No. 5,070,045 concerning the composition of KERALITE® of Eurokera Co., the scope of disclosure of which is hereby fully included in the present application.

A normal-incidence X-ray mirror with a substrate material in accordance with the invention for EUV lithography is characterized by a favorable fine surface figure error, i.e. defects in the low spatial frequency region. This is typically understood as being structural sizes of between one-tenth of the ray bundle cross sections associated to the individual pixels up to the free diameter of the mirror, i.e. the defects lie in the magnitude of millimeters up to several decimeters. Such defects lead to aberrations and reduce the imaging precision and restrict the resolution limits of the system. With the components in accordance with the invention it is possible to achieve fine surface figure error values in the region of $\lambda_R/50$ to $\lambda_R/100$. In the EUV range, i.e. at wavelengths of 10 to 30 nm, this corresponds to 0.1 to 0.2 nm for 10 nm of wavelength and 0.3 to 0.6 nm rms for 30 nm wavelength.

They are further characterized by low roughness in the middle spatial frequency roughness (MSFR) range. These spatial wavelengths lead to light scatter within the image field (flare) and thus to losses in contrast for the imaging lens systems. The errors in the MSFR region can be estimated from formulas for TIS (total integrated scatter). With the invention it is possible to achieve defects in the region of 0.1 to 0.2 nm in EUV lithography applications.

Normal-incidence X-ray mirrors are also characterized by a low thermal expansion. This is important for EUV applications, because approximately 30% of the incident light is absorbed by the multilayer mirrors and is converted into heat. In order to ensure that the surface shape remains in a stable condition under these thermal loads in operation, a material with the lowest possible coefficient of thermal expansion is required in the imaging lens systems. Low coefficients of thermal expansion also contribute to the achievable dimensional precision in heat-producing processing processes.

The roughness of the X-ray optical components in the high spatial frequency roughness (HSFR) range is $<\lambda_R/30$ rms, preferably $<\lambda_R/50$ rms, especially preferably $<\lambda_R/100$ rms. At the same time the defect in the low spatial frequency range (which is the fine surface figure error range) is in the region of $\lambda_R/50$–$\lambda_R/100$ rms and the roughness in the middle spatial frequency roughness (MSFR) region lies simultaneously in the region $\lambda_R/50$–$\lambda_R/100$ rms. At an EUV wavelength of 13 nm this corresponds to a roughness of 0.26 nm to 0.13 nm. The advantage of the substrate material in accordance with the invention is therefore that the roughness values lie in the different frequency ranges (fine surface figure error, MSFR, HSFR) in the region of 0.26 nm to 0.13 nm for EUV wavelengths.

In a first embodiment the X-ray optical component is reticle mask operated in reflection for the EUV lithography, comprising a substrate material in accordance with the invention.

In an alternative embodiment the X-ray optical component is a normal-incidence mirror, with the mirror having a substrate comprising a glass ceramic material as well as a multilayer system with a plurality of layers with high reflectivity in the X-ray range at non-grazing incidence.

Preferably, the multilayer system of the normal incidence mirror which is based on the substrate comprises 40 to 200 layer pairs which consist of one of the following materials: Mo/Si, Mo/Bi, MoRu/Be.

In addition to the glass ceramic material, the invention also provides a method for producing an X-ray optical component for X-rays of wavelength $\lambda_R$, comprising the following steps: The surface of the X-ray optical component is superpolished until a high spatial frequency roughness (HSFR) $<\lambda_R/50$ rms, preferably $\lambda_R/100$ rms, is achieved. Thereafter the surface is further processed with a beam processing method until the defect in the low spatial frequency region is in the range of $\lambda_R/50$–$\lambda_R/100$ rms and the defect in the middle spatial frequency roughness (MSFR) region is in the range of $\lambda_R/50$–$\lambda_R/100$ rms. The materials in accordance with the invention are characterized in that HSFR does not deteriorate substantially after beam processing, but that even after completion of this processing step an HSFR $<\lambda_R/50$ rms, preferably $<\lambda_R/100$ rms, is achieved.

The superpolishing of samples is well known to the person skilled in the art and superpolished samples can be purchased commercially.

Concerning the beam processing method of ion beam figuring (IBF), i.e. ion beam processing, reference is hereby made to L. Allen and H. W. Romig, "Demonstration of ion beam figuring process" in SPIE Vol. 1333 (1990) 22; S. R. Wilson, D. W. Reicher, J. R. McNell, "Surface figuring using neutral ion beams", Advances in Fabrication and Meterology for Optics and large Optics, SPIE, Vol. 966, p. 74–81, August 1988, as well as L. N. Allen and R. E. Keim, "An ion figuring system for large optic fabrication", Current developments in Optical Engineering and Commercial Optics, SPIE, Vol. 1168, p. 33–50, August 1989, the scope of disclosure of which is hereby fully included in the present application.

During the surface processing with ion beam figuring (IBF), an $Ar^+$ beam is guided in a controlled manner over the surface of the substrate to be treated in vacuum by means of a 5-axis motion system. Based on a surface defect profile obtained by means of an interferometer for example, the dwell time of the processing beam is varied in a computer-controlled fashion depending on location. The excavation rate of the beam is proportional to the dwell time. As a result, the processing process is defined which converges rapidly within the stated boundaries. Details in connection with this method can be obtained from the above publications.

In the glass ceramic substrate materials, microcrystallites with negative thermal expansion are embedded in amorphous material with positive thermal expansion. During crystallization, the stoichiometric ratio of the crystal phase to the glass phase is set in such a way that there is a negligible thermal expansion for a specific temperature range, e.g. 0 to 50° C. The size of the crystallite is a free parameter. The inventors have recognized that for the purpose of achieving a negligible thermal expansion in first approximation it is irrelevant whether many small or a few large crystallites are embedded as long as the volume ratio of crystallite to glass remains constant.

The substrate materials in accordance with the invention have crystallite sizes in the magnitude of the wavelength of the incident light, preferably smaller than half of the wavelength.

The inventors have realized that the roughness amplitudes or degradations as induced by ion bombardment scale with the crystallite size. A tolerable degradation is achieved on EUV mirrors with the substrate materials in accordance with the invention after the surface processing, especially beam processing, which degradation is by a factor 3 to 4 times lower than in the case of glass ceramic materials with microcrystallites in the magnitude of 50 nm for example.

The substrate materials in accordance with the invention show roughness in all spatial frequencies (HSFR, MSFR, fine surface figure errors) after the surface treatment in a region which is no longer noticed by the X-ray photons. They can therefore no longer contribute to the reduction of reflectivity.

It should be understood that various alternatives and modifications of the present invention can be devised y those skilled in the art. The present invention is intended to embrace all such alternatives, modifications and variances that fall within the scope of the appended claims.

The invention claimed is:

1. A substrate material for an optical component for X-rays of wavelength $\lambda_R$, comprising:
   a glass phase made of amorphous material having a positive coefficient of thermal expansion; and
   a crystal phase including microcrystallites having a negative coefficient of thermal expansion and a mean size of less than about 4 $\lambda_R$,
   wherein said substrate material has a stoichiometric ratio of said crystal phase to said glass phase such that a coefficient of thermal expansion of said substrate material is less than about $5\times10^{-6}$ $K^{-1}$ in a temperature range of about 20° C. to 100° C., and
   wherein said substrate material, following a surface treatment, has a high spatial frequency roughness (HSFR) of less than about $\lambda_R/30$ rms.

2. The substrate material of claim 1, wherein said coefficient of thermal expansion of said substrate material is less than about $1\times10^{-6}$ $K^{-1}$ in said temperature range.

3. The substrate material of claim 1, wherein said mean size is less than about 2 $\lambda_R$.

4. The substrate material of claim 1, wherein said mean size is less than about $\lambda_R$.

5. The substrate material of claim 16, wherein said mean size is less than about $2\lambda_R/3$.

6. The substrate material of claim 1, wherein said mean size is less than about $\lambda_R/2$.

7. The substrate material of claim 1, wherein said HSFR is less than about $\lambda_R/50$ rms.

8. The substrate material of claim 1, wherein said HSFR is less than about $\lambda_R/100$ rms.

9. The substrate material of claim 1, wherein said wavelength $\lambda_R$ is in a range of about 10 nm to 30 nm.

10. The substrate material of claim 1, wherein said surface treatment includes superpolishing a surface of said substrate material, and thereafter, beam processing said surface.

11. The substrate material of claim 1, wherein said substrate material has a low spatial frequency roughness in a range of about $\lambda_R/50$ to $\lambda_R/100$ rms.

12. The substrate material of claim 1, wherein said substrate material has a middle spatial frequency roughness (MSFR) in a range of about $\lambda_R/50$ to $\lambda_R/100$ rms.

13. The substrate material of claim 12, wherein said MSFR is achieved by beam processing a surface of said substrate material.

14. The substrate material of claim 1, wherein said optical component is a reticle mask.

15. The substrate material of claim 1, wherein said optical component is a normal-incidence mirror providing reflectivity of greater than about 70% to said X-rays at non-grazing incidence.

16. The substrate material of claim 15, wherein said normal-incident mirror has an aspherical shape.

17. The substrate material of claim 1, further comprising a layered pair of materials thereon selected from the group consisting of Mo/Si, Mo/Bi, and MoRu/Be.

18. The substrate material of claim 17, comprising about 40 to 200 layers of said layered pairs of material.

19. A substrate material for an optical component for X-rays of wavelength 10 nm $\leq \lambda_R <$ 30 nm comprising:
   a glass phase made of amorphous material having a positive coefficient of thermal expansion; and
   a crystal phase including microcrystallites having a negative coefficient of thermal expansion and a mean size of less than about 38 nm,
   wherein said substrate material has a stoichiometric ratio of said crystal phase to said glass phase such that a coefficient of thermal expansion of said substrate material is less than about $5 \times 10^{-6}$ $K^{-1}$ in a temperature range of about 20° C. to 100° C., and
   wherein said substrate material, following a surface treatment, has a high spatial frequency roughness (HSFR) of less than about $\lambda_R/30$ rms.

20. The substrate material of claim 19, wherein said mean size is less than about 20 nm.

21. The substrate material of claim 19, wherein said mean size is less than about 10 nm.

22. An optical component for X-rays of wavelength $\lambda_R$, comprising:
   a substrate material that includes:
      a glass phase made of amorphous material having a positive coefficient of thermal expansion; and
      a crystal phase including microcrystallites having a negative coefficient of thermal expansion and a mean size of less than about $4 \lambda_R$,
      wherein said substrate material has a stoichiometric ratio of said crystal phase to said glass phase such that a coefficient of thermal expansion of said substrate material is less than about $5 \times 10^{-6}$ $K^{-1}$ in a temperature range of about 20° C. to 100° C., and
      wherein said substrate material, following a surface treatment, has a high spatial frequency roughness (HSFR) of less than about $\lambda_R/30$ rms.

23. The optical component of claim 22, wherein said optical component is a mirror selected from the group consisting of a normal-incidence mirror and a grazing-incidence mirror.

24. The optical component of claim 22, wherein said optical component is a reticle mask.

25. An EUV projection system, comprising:
   an illumination system for illuminating a mask; and
   a projection lens system for projecting an image of said mask,
   wherein at least one of said illumination system or said projection lens system includes an optical component for X-rays of wavelength $\lambda_R$ having a substrate material that includes (a) a glass phase made of amorphous material having a positive coefficient of thermal expansion, and (b) a crystal phase including microcrystallites having a negative coefficient of thermal expansion and a mean size of less than about $4 \lambda_R$,
   wherein said substrate material has a stoichiometric ratio of said crystal phase to said glass phase such that a coefficient of thermal expansion of said substrate material is less than about $5 \times 10^{-6}$ $K^{-1}$ in a temperature range of about 20° C. to 100° C., and
   wherein said substrate material, following a surface treatment, has a high spatial frequency roughness (HSFR) of less than about $\lambda_R/30$ rms.

26. A system comprising a substrate material that includes:
   a glass phase made of amorphous material having a positive coefficient of thermal expansion; and
   a crystal phase including microcrystallites having a negative coefficient of thermal expansion and a mean size of less than about $4 \lambda_R$,
   wherein said substrate material has a stoichiometric ratio of said crystal phase to said glass phase such that a coefficient of thermal expansion of said substrate material is less than about $5 \times 10^{-6}$ $K^{-1}$ in a temperature range of about 20° C. to 100° C.,
   wherein said substrate material, following a surface treatment, has a high spatial frequency roughness (HSFR) of less than about $\lambda_R/30$ rms, and
   wherein said system is selected from the group consisting of an X-ray microscopy system, an X-ray astronomy system, and X-ray spectroscopy system.

27. A substrate material for an optical component for X-rays of wavelength 10 nm $\leq \lambda_R \leq$ 30 nm, comprising:
   an amorphous material having a positive coefficient of thermal expansion; and
   crystallites having a negative coefficient of thermal expansion and being a mean size of less than about 38 nm,
   wherein the substrate material has a coefficient of thermal expansion of less than about $5 \times 10^{-6}$ $K^{-1}$ in a temperature range of about 20° C. to 100° C., and
   wherein the substrate material has a high spatial frequency roughness (HSFR) of less than about $\lambda_R/30$ rms.

28. The substrate material of claim 27, wherein the substrate material has a middle spatial frequency roughness (MSFR) in a range of about $\lambda_R/50$ to $\lambda_R/100$ rms, and a low spatial frequency roughness in a range of about $\lambda_R/50$ to $\lambda_R/100$ rms.

* * * * *